(12) United States Patent
Gnanasambandam et al.

(10) Patent No.: US 12,402,642 B2
(45) Date of Patent: Sep. 2, 2025

(54) SYSTEM FOR CONCENTRATING PHOSPHOLIPIDS

(71) Applicant: LAND O'LAKES, INC., Arden Hills, MN (US)

(72) Inventors: Ravin Gnanasambandam, Chaska, MN (US); Hasmukh Patel, Plymouth, MN (US)

(73) Assignee: Land O'Lakes, Inc., Arden Hills, MN (US)

( * ) Notice: Subject to any disclaimer, the term of this patent is extended or adjusted under 35 U.S.C. 154(b) by 398 days.

(21) Appl. No.: 17/873,798

(22) Filed: Jul. 26, 2022

(65) Prior Publication Data
US 2022/0361517 A1    Nov. 17, 2022

Related U.S. Application Data

(63) Continuation of application No. 15/969,476, filed on May 2, 2018, now Pat. No. 11,425,915.

(51) Int. Cl.
*A23C 9/14*    (2006.01)
*A23C 1/04*    (2006.01)
(Continued)

(52) U.S. Cl.
CPC .............. *A23C 9/1422* (2013.01); *A23C 1/04* (2013.01); *A23C 9/142* (2013.01); *A23C 17/00* (2013.01); *A23J 7/00* (2013.01); *A23L 33/115* (2016.08); *B01D 61/146* (2022.08); *B01D 61/147* (2013.01); *B01D 61/149* (2022.08);
(Continued)

(58) Field of Classification Search
CPC ......... A23C 9/142; A23C 9/1422; A23C 1/04; A23C 17/00; A23J 7/00; A23L 33/115; A23L 2/00; B01D 61/146; B01D 2201/167; B01D 61/147; B01D 61/149; B01D 61/18
See application file for complete search history.

(56) References Cited

U.S. PATENT DOCUMENTS

| | | |
|---|---|---|
| 4,684,533 A | 8/1987 | Kratochvil |
| 5,677,472 A | 10/1997 | Nyberg et al. |

(Continued)

FOREIGN PATENT DOCUMENTS

| | | |
|---|---|---|
| DE | 19935011 A1 | 2/2001 |
| EP | 2168438 A1 | 3/2010 |

(Continued)

OTHER PUBLICATIONS

International Preliminary Report on Patentability received for International Application No. PCT/US2019/030001, mailed on Nov. 12, 2020, 12 pages.

(Continued)

*Primary Examiner* — John Kim
(74) *Attorney, Agent, or Firm* — Dorsey & Whitney LLP

(57) ABSTRACT

Phospholipid concentration methods involve use of a dairy composition, such as buttermilk or butter serum, as a starting material. The dairy composition is subjected to a first ultrafiltration, yielding a first permeate and a first retentate. The first retentate is treated with carbon dioxide and subjected to microfiltration, yielding a second permeate and a second retentate. The second retentate is treated with carbon dioxide and subjected to a second ultrafiltration, yielding a third permeate and a third retentate. The third retentate includes at least 30 wt % phospholipids.

7 Claims, 4 Drawing Sheets

(51) Int. Cl.
| | |
|---|---|
| A23C 7/00 | (2025.01) |
| A23C 9/142 | (2006.01) |
| A23C 17/00 | (2025.01) |
| A23J 7/00 | (2006.01) |
| A23L 33/115 | (2016.01) |
| B01D 61/14 | (2006.01) |
| B01D 61/18 | (2006.01) |
| A23L 2/00 | (2006.01) |

(52) U.S. Cl.
CPC ............... B01D 61/18 (2013.01); *A23L 2/00* (2013.01); *B01D 2201/167* (2013.01)

(56) References Cited

U.S. PATENT DOCUMENTS

| | | | |
|---|---|---|---|
| 5,844,104 | A | 12/1998 | Yanahira et al. |
| 5,856,453 | A | 1/1999 | Shiota et al. |
| 7,847,113 | B2 | 12/2010 | Kawashima et al. |
| 7,919,131 | B2 | 4/2011 | Fletcher et al. |
| 8,226,995 | B2 | 7/2012 | Nielsen et al. |
| 8,231,922 | B2 | 7/2012 | Burling et al. |
| 8,471,002 | B2 | 6/2013 | Fletcher et al. |
| 2009/0186129 | A1 | 7/2009 | Gamay et al. |
| 2009/0253658 | A1 | 10/2009 | Tanaka et al. |
| 2009/0269458 | A1 | 10/2009 | Miura et al. |
| 2010/0068293 | A1 | 3/2010 | Dalemans et al. |
| 2011/0098254 | A1 | 4/2011 | Brown et al. |
| 2012/0052181 | A1 | 3/2012 | Rivera et al. |
| 2013/0078356 | A1 | 3/2013 | Mackereth et al. |
| 2015/0250195 | A1 | 9/2015 | Patel et al. |
| 2019/0335778 | A1 | 11/2019 | Gnanasambandam et al. |
| 2020/0196622 | A1 | 6/2020 | Burke et al. |

FOREIGN PATENT DOCUMENTS

| | | |
|---|---|---|
| EP | 2227934 B1 | 11/2011 |
| EP | 3158871 A1 | 4/2017 |
| JP | S63269992 A | 11/1988 |
| JP | 2006158340 A | 6/2006 |
| WO | 0049882 A1 | 8/2000 |
| WO | 2007123424 A1 | 11/2007 |
| WO | 2009131470 A1 | 10/2009 |
| WO | 2017087878 A1 | 5/2017 |

OTHER PUBLICATIONS

Alves, et al., "Phospholipid Dry Powders Produced by Spray Drying Processing: Structural, Thermodynamic and Physical Properties", Powder Technology, vol. 145, pp. 139-148, Aug. 20, 2004, Elsevier B.V.

Arla Foods Ingredients, "Lacpodan MFGM-10 Whey Protein Concentrate", 2010, 1 pages.

Arla Foods Ingredients, "Technical Data Lacprodan PL-20", 2006, 1 page.

Astaire, J. C. et al., "Concentration of Polar MFGM Lipids from Buttermilk by Microfiltration and Supercritical Fluid Extraction", Journal of Dairy Science, American Dairy Science Association, vol. 86, No. 7, pp. 2297-2307, Jul. 1, 2003.

Corredig, M. et al., "Production of a Novel Ingredient from Buttermilk", Journal of Dairy Science, American Dairy Science Association, US, vol. 86, Jan. 1, 1998, pp. 2744-2750.

Dewettinck, et al., "Nutritional and technological aspects of milk fat globule membrane material", International Dairy Journal vol. 18, 2008, pp. 436-457.

Evans, et al., "Wrinkling of milk skin is mediated by evaporation", Soft Matter; the Royal Society of Chemistry, 2017, 7 pages.

Gassi, et al., "Preparation and characterisation of a milk polar lipids enriched ingredient from fresh industrial liquid butter serum: Combination of physico-chemical modifications and technological treatments", International Dairy Journal vol. 52, 2016, pp. 26-34.

Herald, et al., "Degradable Wheat Gluten Films: Preparation, Properties and Applications", Journal of Food Science; vol. 60, No. 5, 1995, pp. 1147-1150.

Land O'Lakes, "PL from Buttermilk and Butter Serum—Membrane Filtration", Unknown, 1 page.

Sachdeva, S. et al., "Recovery of Phospholipids from Buttermilk Using Membrane Processing", Kieler Wirtschaftliche Forschungsberichte, Verlag Th. Mann, Gelsenkirchen, DE, vol. 49, No. 1, pp. 47-68, Jan. 1, 1997.

Spence, et al., "Phospholipid Enrichment in Sweet and Whey Cream Buttermilk Powders Using Supercritical Fluid Extraction", Journal of Dairy Science, vol. 92, No. 6, pp. 2373-2381, 2009, American Dairy Science Association.

Zhu, et al., "Dairy Lecithin from Cheese Whey Fat Globule Membrane: Its Extraction, Composition, Oxidative Stability, and Emulsifying Properties", J. Am. Oil Chem. Soc. vol. 90, 2013, pp. 217-224.

International Search Report and Written Opinion issued in International Application No. PCT/US2019/030001, mailed on Aug. 19, 2019, 18 pages.

"Cheddar Cheese", Science Direct, relevant information from Science Direct extensive collection of content, retrieved from https://www.sciencedirect.com/topics/veterinary-science-and-veterinary-medicine/cheddar-cheese, (2023).

400

```
┌─────────────────────────────────────────────────────────────┐
│ Subjecting a dairy composition to a first ultrafiltration,  │─402
│ wherein the first ultrafiltration yields a first permeate and│
│                    a first retentate                         │
└─────────────────────────────────────────────────────────────┘
                              │
                              ▼
┌─────────────────────────────────────────────────────────────┐
│        Treating the first retentate with carbon dioxide      │─404
└─────────────────────────────────────────────────────────────┘
                              │
                              ▼
┌─────────────────────────────────────────────────────────────┐
│ Subjecting the first retentate to microfiltration, wherein   │─406
│ the microfiltration yields a second permeate and a second    │
│                          retentate                           │
└─────────────────────────────────────────────────────────────┘
                              │
                              ▼
┌─────────────────────────────────────────────────────────────┐
│       Treating the second retentate with carbon dioxide      │─408
└─────────────────────────────────────────────────────────────┘
                              │
                              ▼
┌─────────────────────────────────────────────────────────────┐
│ Subjecting the second retentate to a second ultrafiltration, │─410
│ wherein the second ultrafiltration yields a third permeate   │
│                    and a third retentate                     │
└─────────────────────────────────────────────────────────────┘
                              │
                              ▼
┌─────────────────────────────────────────────────────────────┐
│ Collecting the third retentate, wherein the third retentate  │─412
│      comprises at least about 30 wt% phospholipids.          │
└─────────────────────────────────────────────────────────────┘
```

*FIG. 4*

SYSTEM FOR CONCENTRATING PHOSPHOLIPIDS

CROSS-REFERENCE TO RELATED APPLICATIONS

This application claims priority to U.S. patent application Ser. No. 15/969,476, filed May 2, 2018, issued as U.S. Pat. No. 11,425,915, on Aug. 30, 2022, entitled "METHODS OF CONCENTRATING PHOSPHOLIPIDS," which is incorporated by reference herein, in its entirety and for all purposes.

TECHNICAL FIELD

The present disclosure relates to phospholipid concentration methods. Implementations utilize dairy byproducts as a phospholipid source and apply a combination of selective membrane filtration and carbon dioxide treatment as a phospholipid concentration and purification technique.

BACKGROUND

Milk fat globule membranes (MFGMs) are complex biological membranes comprising a matrix of phospholipids, glycolipids, glycoproteins, glycerides, fatty acids, and enzymes. Among the molecular components of MFGMs, milk phospholipids, in particular, offer important health benefits including cholesterol regulation, improved brain function, reduced inflammation and stress, nervous system myelination, improved neurological development, cancer inhibition, and prevention of cardiovascular diseases and infections. Milk phospholipids also have emulsifying and emulsion stabilization properties, making them useful as whipping agents, emulsifiers and stabilizers in various food applications.

Byproducts of butter manufacturing, including buttermilk and butter serum, are sources of milk phospholipids. Buttermilk is a byproduct of cream churning, and butter serum is a byproduct of anhydrous milk fat production. Despite the phospholipids present in buttermilk, butter serum and other dairy compositions, each of these byproducts are widely considered as waste products of little commercial value. Systems and methods of concentrating, purifying and extracting phospholipids from such compositions are desired.

SUMMARY

In accordance with principles of the present disclosure, a method of concentrating phospholipids can involve subjecting a dairy composition to a first ultrafiltration, yielding a first permeate and a first retentate, and treating the first retentate with carbon dioxide. The method can further involve subjecting the first retentate to microfiltration, yielding a second permeate and a second retentate, and treating the second retentate with carbon dioxide. The method can also involve subjecting the second retentate to a second ultrafiltration, yielding a third permeate and a third retentate. The third retentate can be collected, and may contain at least about 30 wt % phospholipids.

In some examples, the dairy composition comprises butter serum or buttermilk. In some embodiments, the method further involves spray drying the third retentate to yield a powder composition. In some implementations, the first retentate is treated with carbon dioxide during microfiltration. In some examples, the second retentate is treated with carbon dioxide during the second ultrafiltration. In some embodiments, the first ultrafiltration is performed using a first ultrafiltration membrane configured to retain molecules having a molecular weight greater than about 10 kDa. In some implementations, treating the first retentate with carbon dioxide lowers the pH of the first retentate to a range of about 5.2 to about 5.4. In some examples, the second retentate and the third retentate have a pH ranging from about 5.2 to about 5.4. Embodiments may further involve adding water to the first and/or second retentate.

In accordance with principles of the present disclosure, a system for concentrating phospholipids can include a first ultrafiltration apparatus configured to subject a dairy composition to a first ultrafiltration, thereby yielding a first permeate and a first retentate. The system can further include a microfiltration apparatus configured to subject the first retentate to microfiltration, thereby yielding a second permeate and a second retentate. The system can further include a second ultrafiltration apparatus configured to subject the second retentate to a second ultrafiltration, thereby yielding a third permeate and a third retentate, where the third retentate comprises a solution comprising at least about 30 wt % phospholipids. The system can also include a treatment chamber housing the microfiltration apparatus and the second ultrafiltration apparatus, A carbon dioxide injector can be coupled with the treatment chamber and configured to inject carbon dioxide into the treatment chamber, the microfiltration apparatus, and the second ultrafiltration apparatus.

In some examples, the system also includes a drying apparatus configured to dry the third retentate to yield a powder composition from the solution. In some embodiments, the carbon dioxide injector is configured to reduce the pH of the first retentate and the second retentate to a range of about 5.2 to about 5.4 within the treatment chamber. After exiting the treatment chamber, in some examples, the pH of the third retentate can be restored to a range of about 6.3 to about 6.5 without adding a base to the third retentate. In various embodiments, the dairy composition comprises buttermilk or butter serum. In some implementations, the carbon dioxide injector is coupled to the microfiltration apparatus via a first valve-controlled tube and is coupled to the second ultrafiltration apparatus via a second valve-controlled tube. In some implementations, the microfiltration apparatus and the second ultrafiltration apparatus are exposed to an internal environment of the treatment chamber. In some examples, the system also includes a water source configured to inject water into the second retentate. In some embodiments, the first ultrafiltration apparatus comprises a first ultrafiltration membrane configured to retain molecules having a molecular weight greater than about 10 kDa.

In accordance with principles of the present disclosure, an edible composition can include a total fat content of about 40 to about 45 wt %, where about 90 wt % of the total fat content comprises phospholipids. The composition may also have a total protein content of about 40 to about 45 wt %, and a lactose content of about 3 to about 5 wt %. In various embodiments, the edible composition may include a liquid sourced from buttermilk or butter serum.

BRIEF DESCRIPTION OF THE DRAWINGS

FIG. 4 is a flow diagram of an phospholipid concentration method performed in accordance with principles of the present disclosure.

DETAILED DESCRIPTION

Implementations provide systems and methods of concentrating milk phospholipids from dairy products to produce compositions high in phospholipid content. Methods involve sequential and selective membrane filtrations of a starting material, which can comprise buttermilk or butter serum in some examples. Milk phospholipids are primarily located in MFGMs, and the methods disclosed herein involve controlled disruption of the MFGMs, followed by separation and concentration of the phospholipids detached therefrom. Unlike preexisting methods of phospholipid concentration and/or concentration, the methods described herein may not involve centrifugation or acidification. A novel combination of carbon dioxide ($CO_2$) treatment and membrane filtration is instead employed in a manner that effectively concentrates phospholipids from a starting composition without damaging the phospholipid molecules. In embodiments, the methods can be scaled up to produce large, e.g., commercial, volumes of phospholipid-rich compositions, which may be more concentrated and higher in quality compared to phospholipid products prepared according to preexisting methods.

Membrane separation or fractionation technologies employed herein may include microfiltration, ultrafiltration, diafiltration, nanofiltration, reverse and/or forward osmosis, either individually or in combination, and optionally with any of the technologies described herein. Various types of specialized membranes can be used, including charged membranes, e.g., membranes with cationic and/or anionic surfaces, hydrophobic and/or hydrophilic surfaces, or membranes containing ligands such as ion-exchange or cross-linked membranes. Various types of membranes may be used, including spiral membranes, which may be comprised of ceramic material, sheet membranes comprised of polymeric material, disk membranes comprised of metal material, and/or hollow membranes comprised of fiber.

Figure 1:
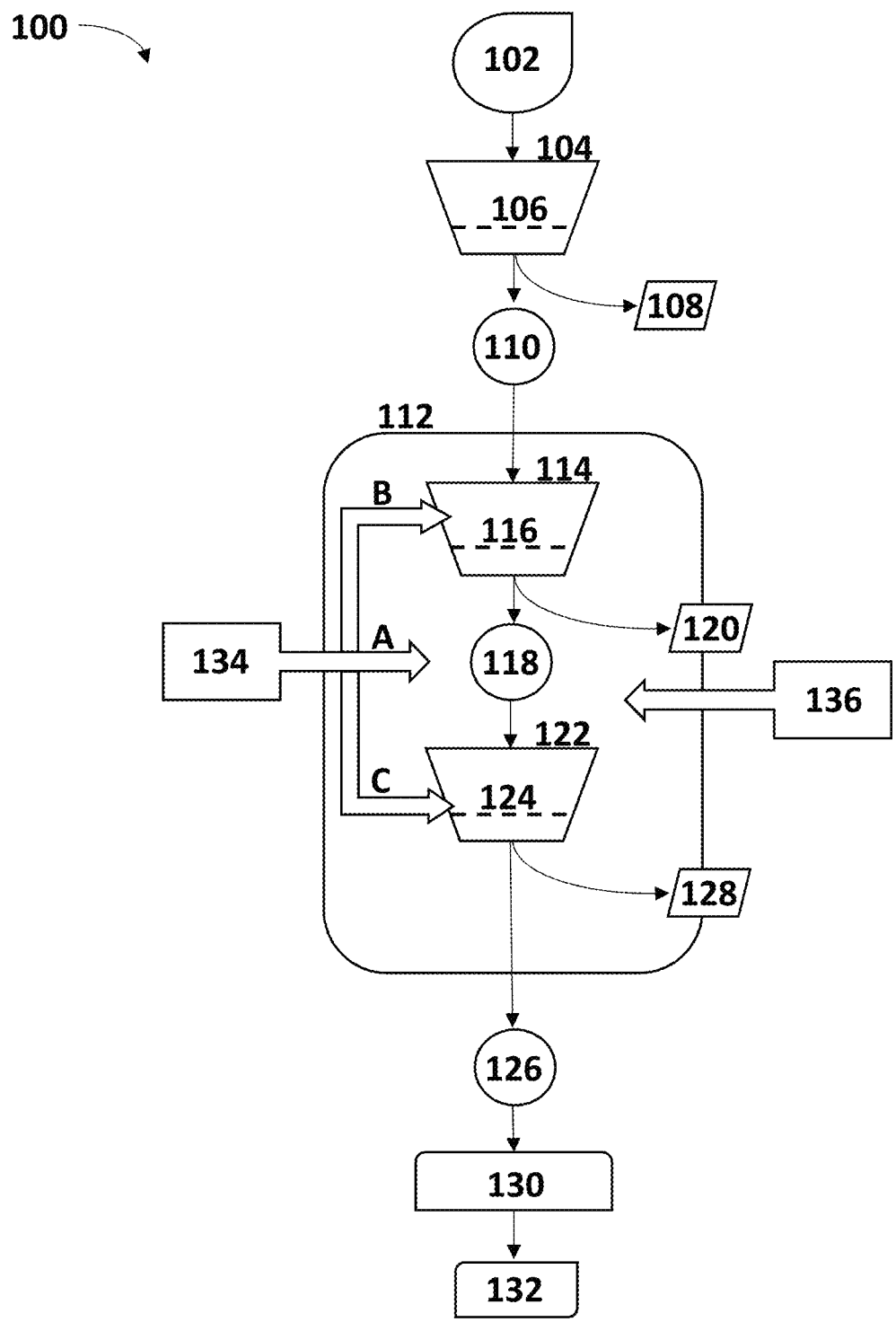
FIG. 1 is a block diagram of a phospholipid concentration system in accordance with principles of the present disclosure.

FIG. 1 shows an example system 100 configured to concentrate, extract, and/or purify phospholipids according to principles of the present disclosure. As shown, the system 100 can be configured to receive a starting composition 102, which may comprise a dairy product or byproduct, in a first ultrafiltration apparatus 104, which includes a first ultrafiltration membrane 106. Ultrafiltration of the starting composition 102 yields a first permeate 108 and a concentrated first retentate 110. The first retentate 110 can be transported into a treatment chamber 112, which may include one or more additional filtration apparatuses. In the example shown, the treatment chamber 112 includes two filtration apparatuses. A microfiltration apparatus 114, which includes a microfiltration membrane 116, filters the first retentate 110 to form a microfiltration retentate 118 and a microfiltration permeate 120. The microfiltration retentate 118 is then filtered through a second ultrafiltration apparatus 122, which includes a second ultrafiltration membrane 124, thereby yielding a third retentate 126 and a third permeate 128. The third retentate 126 can include a concentrated phospholipid solution, which may be collected and dried in a drying apparatus 130, thereby yielding a concentrated phospholipid powder 132. As further shown, the treatment chamber 112 can be coupled with at least one carbon dioxide injector 134, which can be configured to treat the first retentate 110, microfiltration retentate 118 and/or third retentate 126 with carbon dioxide. The system 100 can be configured to operate in continuous or batch mode. In embodiments, various components of the system may be excluded, and additional components added. While systems and methods of phospholipid concentration are described herein, it is understood that the optional removal of additional components from the various starting compositions and the extent of concentration implemented according to various embodiments of the present disclosure may be synonymous with systems and methods of phospholipid extraction and/or purification.

The starting composition 102 can include liquid buttermilk, butter serum, whey cream buttermilk, acid buttermilk cheese whey, pasteurized cream, and/or combinations thereof. In various embodiments, the starting composition 102 can be sourced as a byproduct from a dairy manufacturing process, such as a process used to produce butter, cheese, milk, or reduced-fat milk from various animal species, e.g., bovine. In some examples, the starting composition 102 may be subjected to one or more pre-treatment steps before the phospholipid concentration process begins. Pre-treatment may be necessary to remove impurities or change the form, e.g., dry or liquid, of the starting composition. In some examples, the starting composition can be a dry powder, a reconstituted liquid, or a fresh liquid. The phospholipid concentration of the starting composition 102 may vary, ranging from about 0.1 to about 3.0% by dry weight of the starting composition. The pH of the starting composition 102 may also vary, ranging from about 6.2 to about 7.2, about 6.3 to about 6.5, about 6.4 to about 7.0, about 6.4 to about 6.7, or about 6.4.

In some examples, a first ultrafiltration step may be implemented using the first ultrafiltration apparatus 104, which may comprise a temperature-controlled tank coupled with one or more pumps. For instance, the first ultrafiltration apparatus 104 can include an input pump configured to input the starting composition 102 into a temperature-controlled tank containing the first ultrafiltration membrane 106, which may be ceramic or polymeric. The first ultrafiltration apparatus 104 may also be coupled with two output pumps: one pump configured to remove the permeate 108 and pump it into a permeate collection tank, and one pump configured to remove the retentate 110 and pump it into a retention collection tank.

The starting composition 102 may be driven, via artificially pressurized mechanisms or gravity, across the first ultrafiltration membrane 106. The first ultrafiltration membrane 106 included in the first ultrafiltration apparatus 104 may vary in pore size and dimensions. In embodiments, the pore size of the first ultrafiltration membrane 106 may be configured to retain, in the first retentate 110, components of the starting composition that have a molecular weight greater than about 5 kDa to about 50 kDa, about 5 kDa to about 40 kDa, about 5 kDa to about 30 kDa, about 5 kDa to about 20 kDa, about 5 kDa to about 15 kDa, about 8 kDa to about 12 kDa, or about 10 kDa. Depending on the desired throughput, the first ultrafiltration membrane 106 may define a rectangular perimeter ranging in size from about 2 in. by about 50 in., about 3 in. by about 40 in., about 4 in. by about 35 in., about 6 in. by about 30 in., about 8 in. by about 25 in., about 10 in. by about 22 in., about 12 in. by about 18 in., or about 14 in. by about 16 in. In specific embodiments, the first ultrafiltration membrane 106 may define a size of the ultrafiltration membrane unit measuring about 3.8 in to by about 38 in. The components of the first permeate 108 may include water, lactose and various minerals. In some examples, the native state of the polymers removed with the permeate 108 may be retained, which may facilitate re-use of such polymers in other processes.

The first ultrafiltration step may be optional and can be omitted if, for example, the phospholipid concentration of the starting composition 102 is sufficient for producing a desired phospholipid-rich product without the initial removal of water and lactose via the first ultrafiltration apparatus 104. Maintaining consistent filtration at the original pore size may require periodic cleaning or replacement of the filtration membrane 106. Depending on the throughput of the first ultrafiltration apparatus 104 and the applicable sanitation regulations, the membrane may be cleaned about every 24 to 48 hours.

After the optional first ultrafiltration step, the concentrated first retentate 110 can be transferred to a treatment chamber 112. In the treatment chamber 112, prior to passage through the microfiltration apparatus 114, the first retentate 110 can be subjected to $CO_2$ treatment. The $CO_2$ treatment temporarily lowers the pH of the retentate 110, for example to a level of about 4.8, 4.9, 5.0, 5.1, 5.2, 5.3, 5.4, 5.5, 5.6, 5.7 or 5.8, without producing any acidic byproducts or salts and without dissolving the lipid components present within the MFGMs, as is commonly observed during super-critical $CO_2$ treatment. In various examples, the extent of pH reduction achieved via $CO_2$ treatment can vary depending on the raw material, e.g., butter serum or buttermilk, and the fat content thereof. Temporary pH reduction via $CO_2$ treatment stimulates dissociation of MFGM components, such that the phospholipids are detached from other lipids and proteins, without compromising taste or functionality. Carbon dioxide treatment may also dissociate large protein complexes into smaller components and micelles, and may separate different varieties of phospholipids from each other. For example, the efficiency of extracting dairy phospholipids such as sphingomyelin, phosphatidyl inositol and phosphatidyl serine is limited at higher pH levels, e.g., 6.5, and extraction efficiency increases as the pH is decreased toward 4.5, which is the isoelectric pH of the phosphate group in phospholipids. The injection of $CO_2$ helps to temporarily lower the pH of buttermilk to a pH range of about 5.5 to 5.8, and an even lower pH, e.g., about 4.8 to 5.2, for butter serum. This novel acidification approach, which may be specific to buttermilk and/or butter serum in some examples, thus drives efficient separation of dairy phospholipids. By treating the retentate stream with $CO_2$ instead of an acid, e.g., hydrochloric acid, or other compounds, e.g., sodium citrate, trisodium citrate, calcium chloride and/or zinc acetate, the pH can be lowered temporarily and the MFGM components dissociated without causing simultaneous protein aggregation and localized precipitation. In addition to being more natural and sanitary, $CO_2$ treatment may also improve the efficiency and effectiveness of the sequential filtration steps implemented by the system 100, thereby enabling a more concentrated phospholipid product to be attained faster and/or in fewer filtration steps.

The $CO_2$ treatment may involve injecting $CO_2$ directly into the treatment chamber 112, thereby filling the chamber with $CO_2$, and/or injecting $CO_2$ in a compartmentalized fashion, such as through one or more tubes within the treatment chamber 112 that are positioned to intercept the stream of various retentate compositions before and after the filtration steps conducted within the chamber. In some examples, the $CO_2$ injector 134 can comprise a single $CO_2$ chamber coupled with the treatment chamber 112 via one or more valve-controlled tubes that define $CO_2$ pathways into the chamber. As shown in FIG. 1, three or more tubes may connect the $CO_2$ injector 134 with the retentate stream at various stages of filtration. In some examples, incoming $CO_2$ may fill the treatment chamber 112 via injection pathway A, thereby creating a controlled $CO_2$ environment within the chamber that exposes the various retentate compositions to $CO_2$, which are thus subjected to continuous $CO_2$ exposure. In some examples, injection pathways B and C may direct a compartmentalized influx of $CO_2$ into the microfiltration apparatus 114 and the second ultrafiltration apparatus 122, respectively, such that the compositions passing therethrough are exposed to $CO_2$ during the filtration steps implemented therein. The extent of pH reduction may vary and may be adjusted by modifying the concentration and/or rate of $CO_2$ injected via the $CO_2$ injector 134. The amount of $CO_2$ injected into the treatment chamber 112 and/or one of the filtration apparatuses housed therein may be limited by a $CO_2$ saturation point, which prevents the pH from dropping below about 5.0 in some examples.

After the optional first ultrafiltration step and the initial exposure of the first retentate 110 to $CO_2$, the retentate 110 is transferred into the microfiltration apparatus 114. The microfiltration apparatus 114 can comprise a temperature-controlled tank coupled with one or more pumps. The microfiltration conditions, e.g., time, temperature, pressure, etc., may vary within the microfiltration apparatus 114. For example, the temperature may be elevated during microfiltration, or the temperature may be held at or even below approximately ambient, e.g., room temperature. In some embodiments, the temperature may be elevated to about 45° F. to about 180° F., about 55° F. to about 160° F., about 65° F. to about 140° F., about 75° F. to about 125° F., about 85° F. to about 115° F., about 95° F. to about 105° F., or about 100° F. Temperature may impact the manner in which some MFGM components are dissociated, which may influence the composition of the microfiltration retentate and/or permeate. For example, depending on the temperature during microfiltration, beta-casein may distribute relatively evenly between the retentate and permeate, or it may be retained primarily in the retentate or permeate. At lower microfiltration temperatures, e.g. 40-45° F., beta-casein may dissociate from casein micelles and move to soluble phase. Accordingly, when microfiltration is performed at lower temperatures, e.g. 40-45° F., the beta-casein may pass into the permeate. By contrast, dissociation of beta-casein may not occur above about 70° F., and as a result, beta-casein may be retained in the retentate when microfiltration is performed at temperatures greater than about 70° F. Because beta-casein is the most hydrophobic casein component, adjusting the processing temperature applied during microfiltration may modify the hydrophobicity and emulsification properties of the finished product. The temperature applied during microfiltration may thus be adjusted to change the compositional properties of the microfiltration retentate. The pressure within the microfiltration apparatus 114 may also vary, ranging from about 5 psi to about 50 psi, about 10 psi to about 40 psi, about 15 psi to about 30 psi, about 18 psi to about 22 psi, or about 20 psi. The flow rate through the microfiltration apparatus 114, and thus the filtration membrane 116 therein, may also vary, ranging from about 0.1 gallons per minute (gpm) to about 10 gpm, about 0.5 gpm to about 8 gpm, about 1 gpm to about 6 gpm, about 1.5 gpm to about 4 gpm, about 1.5 gpm to about 2.5 gpm, about 2 gpm to about 3 gpm, or about 2 gpm.

The microfiltration membrane 116 included in the microfiltration apparatus 114 may vary in dimensions and/or pore size. In embodiments, the pore size of the microfiltration membrane 116 may be configured to retain, in the microfiltration retentate 118, components of the first retentate 110 or starting composition 102 having a molecular weight ranging from about 500 kDa to about 1000 kDa, about 700 kDa to about 900 kDa, about 750 kDa to about 850 kDa, about 775 kDa to about 825 kDa, or about 800 kDa. The pore size of the membrane 116 may range from about 0.05 µm to about 0.5 µm, about 0.1 µm to about 0.4 µm, about 0.1 µm to about 0.3 µm, about 0.3 µm, about 0.2 µm, or about 0.1 µm. Depending on the desired throughput, the microfiltration membrane 116 may define a rectangular perimeter ranging in size from about 2 in. by about 50 in., about 3 in. by about 40 in., about 4 in. by about 35 in., about 6 in. by about 30 in., about 8 in. by about 25 in., about 10 in. by about 22 in., about 12 in. by about 18 in., or about 14 in. by about 16 in. In specific embodiments, the microfiltration membrane 116 may define a rectangular perimeter measuring about 4.3 in. by about 35.5 in. The permeate 120 can include various large molecular weight proteins, e.g., whey, and lactose, and minerals.

As mentioned above, the microfiltration retentate 118 can be exposed to $CO_2$ due to injection of the gas within the entire chamber 112 via pathway A. By maintaining constant or nearly constant $CO_2$ exposure, the pH of the microfiltration retentate 118 may be maintained at about 4.8, 4.9, 5.0, 5.1, 5.2, 5.3, 5.4, 5.5, 5.6, 5.7 or 5.8. In various embodiments, the $CO_2$ does not include super-critical $CO_2$. Embodiments may further involve water injection before, during and/or after passage through the microfiltration apparatus 114. The water may be injected via water injector 136 concurrently with $CO_2$ injection. Adding water to the processing stream may wash additional lactose and other unwanted particulate matter from the first retentate 110 and the microfiltration retentate 118. Water injection may also render the first retentate 110 more easily filterable.

The microfiltration retentate 118 may then be transferred to the second ultrafiltration apparatus 122. Like the first ultrafiltration apparatus 104, the second ultrafiltration apparatus 122 may comprise a temperature-controlled tank coupled with one or more pumps. The ultrafiltration conditions, e.g., time, temperature, pressure, etc., may also vary. For example, the temperature may be elevated during ultrafiltration, or the temperature may be held at or even below approximately ambient, e.g., room, temperature. In some embodiments, the temperature may be elevated to about 45° F. to about 180° F., about 55° F. to about 170° F., about 65° F. to about 160° F., about 80° F. to about 140° F., about 90° F. to about 130° F., about 105° F. to about 130° F., about 109° F. to about 130° F., about 100° F. to about 120° F., about 105° F. to about 115° F., or about 110° F. In additional embodiments, the temperature may range from about 60° F. to about 80° F., about 65° F. to about 75° F., or about 68° F. to about 74° F. In additional embodiments, the temperature may range from about 40° F. to about 60° F., about 45° F. to about 55° F., or about 48° F. to about 52° F. Temperature may impact the manner in which some MFGM components are dissociated, which may influence the composition of the ultrafiltration retentate and/or permeate. For example, as described above with respect to microfiltration, depending on the temperature during ultrafiltration, beta-casein may distribute relatively evenly between the retentate and permeate, or it may be retained primarily in the retentate or permeate. At lower ultrafiltration temperatures, e.g. 40-45° F., beta-casein may dissociate from casein micelles and move to soluble phase. When ultrafiltration is performed at lower temperatures, e.g. 40-45° F., the beta-casein may pass into the permeate. By contrast, dissociation of beta-casein may not occur above about 70° F., and as a result, beta-casein may be retained in the retentate when ultrafiltration is performed at temperatures greater than about 70° F. Because beta-casein is the most hydrophobic casein component, adjusting the processing temperature applied during ultrafiltration may modify the hydrophobicity and emulsification properties of the finished product. The temperature applied during ultrafiltration may thus be adjusted to change the compositional properties of the ultrafiltration retentate. The pressure within the second ultrafiltration apparatus 122 may also vary, ranging from about 20 psi to about 100 psi, about 30 psi to about 90 psi, about 40 psi to about 80 psi, about 50 psi to about 70 psi, about 55 psi to about 65 psi, or about 60 psi. The flow rate through the second filtration apparatus 122, and thus the filtration membrane therein, may also vary, ranging from about 0.1 gpm to about 10 gpm, about 0.5 gpm to about 8 gpm, about 1 gpm to about 6 gpm, about 1.5 gpm to about 4 gpm, about 1.5 gpm to about 2.5 gpm, about 2 gpm to about 3 gpm, or about 2 gpm. In various embodiments, the second ultrafiltration membrane 124 may not be loaded with charged particles or antibodies.

The second ultrafiltration membrane 124 included in the second ultrafiltration apparatus 122 may also vary in dimensions and/or pore size. In embodiments, the pore size of the second filtration membrane 124 may be configured to retain, in the third retentate 126, components of the microfiltration retentate 118 having a molecular weight greater than about 500 kDa to about 1000 kDa, about 700 kDa to about 900 kDa, about 750 kDa to about 850 kDa, about 775 kDa to about 825 kDa, or about 800 kDa. The pore size of the membrane 116 may range from about 0.05 µm to about 0.5 µm, about 0.1 µm to about 0.4 µm, about 0.1 µm to about 0.3 µm, about 0.3 µm, about 0.2 µm, or about 0.1 µm. Depending on the desired throughput, the second ultrafiltration membrane 124 may define a rectangular perimeter ranging in size from about 2 in. by about 50 in., about 3 in. by about 40 in., about 4 in. by about 35 in., about 6 in. by about 30 in., about 8 in. by about 25 in., about 10 in. by about 22 in., about 12 in. by about 18 in., or about 14 in. by about 16 in. In specific embodiments, the second ultrafiltration membrane 124 may define a rectangular perimeter measuring about 4.3 in. by about 35.5 in. The third permeate 128 may comprise water, whey, dissociated caseins and various minerals.

During the second ultrafiltration step, the microfiltration retentate 118 can be subjected to continued $CO_2$ exposure, such that the incoming microfiltration retentate 118 and outgoing third retentate 126 are maintained at a pH of about 4.8, 4.9, 5.0, 5.1, 5.2, 5.3, 5.4, 5.5, 5.6, 5.7 or 5.8. Carbon dioxide treatment within the second ultrafiltration apparatus 122 may be achieved via $CO_2$ injection through pathway C.

The third retentate 126 can comprise a liquid rich in phospholipids, and may thus be referred to as a phospholipid concentrate. The final phospholipid yield may vary depending on the initial lipid concentration of the starting composition 102. In some examples, the phospholipid concentration in the third retentate 126 may range from about 5 to about 40 wt %, about 10 to about 40 wt %, about 20 to about 40 wt %, about 30 to about 40 wt %, about 36 to about 40 wt %, about 38 to about 40 wt %, or about 39 wt %. The final phospholipid concentration may be about three to about 20 times greater than the starting composition 102. According to various embodiments, the final phospholipid concentration of a third retentate derived from a buttermilk starting composition may be about 5.8 wt %, and the final phospholipid concentration of a third retentate derived from a butter serum starting composition may be about 39 wt %. The third retentate 126 may retain a majority of the total functional protein content of the original starting composition 102, and may be considered a lactose-reduced composition rich in protein and milk phospholipids comprised of about 15% total solids. In some examples, the concentrated phospholipids may be maintained in complexes with functional proteins. The phospholipid concentration may be quantified by pooling the third permeate 126 and analyzed using a High Performance Liquid Chromatograph or other similar methods available for quantifying polar lipids. The third retentate 126 may be further comprised of about 3 to about 5 wt % lactose. In some examples, the lactose content may vary depending on the starting composition. For example, if the starting composition comprises buttermilk, the final lactose concentration may range from about 1 to about 8 wt %, about 2 to about 6 wt %, or about 3 to about 4 wt %. If the starting composition comprises butter serum, the final lactose concentration may be similar, ranging from about 1 to about 8 wt %, about 2 to about 6 wt %, about 3 to about 5 wt %, or about 4 wt %. The total fat content of the third retentate may also vary, ranging from about 8 to about 45 wt %. In some examples, the fat content may also vary depending on the starting composition. For example, if the starting composition comprises buttermilk, the final fat concentration may range from about 8 to about 28 wt %, about 10 to about 24 wt %, about 14 to about 20 wt %, or about 16 to about 18 wt %. If the starting composition comprises butter serum, the final fat concentration may be higher, ranging from about 35 to about 45 wt %, about 40 to about 45 wt %, about 41 to about 44 wt, or about 43 wt %. The third retentate 126 may also comprise a higher protein content than the starting composition. The protein content may also vary depending on which starting composition is used. For example, if the starting composition comprises buttermilk, the final protein concentration may range from about 60 to about 80 wt %, about 64 to about 78 wt %, or about 70 to about 74 wt %. If the starting composition comprises butter serum, the final protein concentration may be lower, ranging from about 35 to about 45 wt %, about 40 to about 45 wt %, about 41 to about 44 wt, or about 43 wt %. The concentration of specific phospholipids may also vary. For instance, the final concentration of phosphatidyl ethanolamine, phosphatidyl inositol, phosphatidyl serine, phosphatidyl choline and sphingomyelin may vary. In some embodiments, the concentration of phosphatidyl ethanolamine may be the highest relative to the other phospholipids present in the third retentate 126.

After collection of the third retentate 126, e.g., in a tank, tub, or other container, it may be transferred to a spray dryer 130, which dries the retentate into a phospholipid-rich powder 132 that may be later reconstituted with a liquid or admixed with various food products. In some examples, the third retentate 126 may be transferred directly to the spray dryer 130 via a tube or pump. After exiting the treatment chamber 112 and the $CO_2$ contained therein, the pH of the retentate 126 is naturally restored back to about 6.4, which is approximately the pH of buttermilk and butter serum, or a pH ranging from about 6.1 to about 6.8, about 6.2 to about 6.6, or about 6.3 to about 6.5. In some examples, the third retentate 126 may be heated, which may restore the pH to natural levels more quickly.

The third retentate 126, whether in a concentrated liquid, powder or reconstituted form, may have enhanced emulsification, stability and/or whipping properties valuable for a wide range of applications. In some examples, the retentate 126 can be incorporated into nutritional products such as various nutraceuticals and/or infant foods. Due to its naturally enhanced emulsification properties, the retentate 126 may be utilized as a clean label emulsifier, thickener and/or stabilizer for various food applications, e.g., low fat butter, low fat butter and oil blends, compound butters, buttery spreads, cheese and/or sauces. Addition of the retentate 126 to various food products may improve the texture, mouthfeel, flavor, and/or freeze-thaw stability of such products.

Depending on the starting material and batch size, the purification process may be performed in about 8 to about 10 hours. The total processing time may be greater if one or more pre-treatment steps are implemented. The concentration techniques implemented by the system 100 may be scaled up for commercial production. Increasing production may involve increasing a flow rate and/or increasing the quantity of starting materials. Additional ultrafiltration, diafiltration and/or microfiltration apparatuses may also be implemented and configured to operate in parallel, for example.

Figure 2:
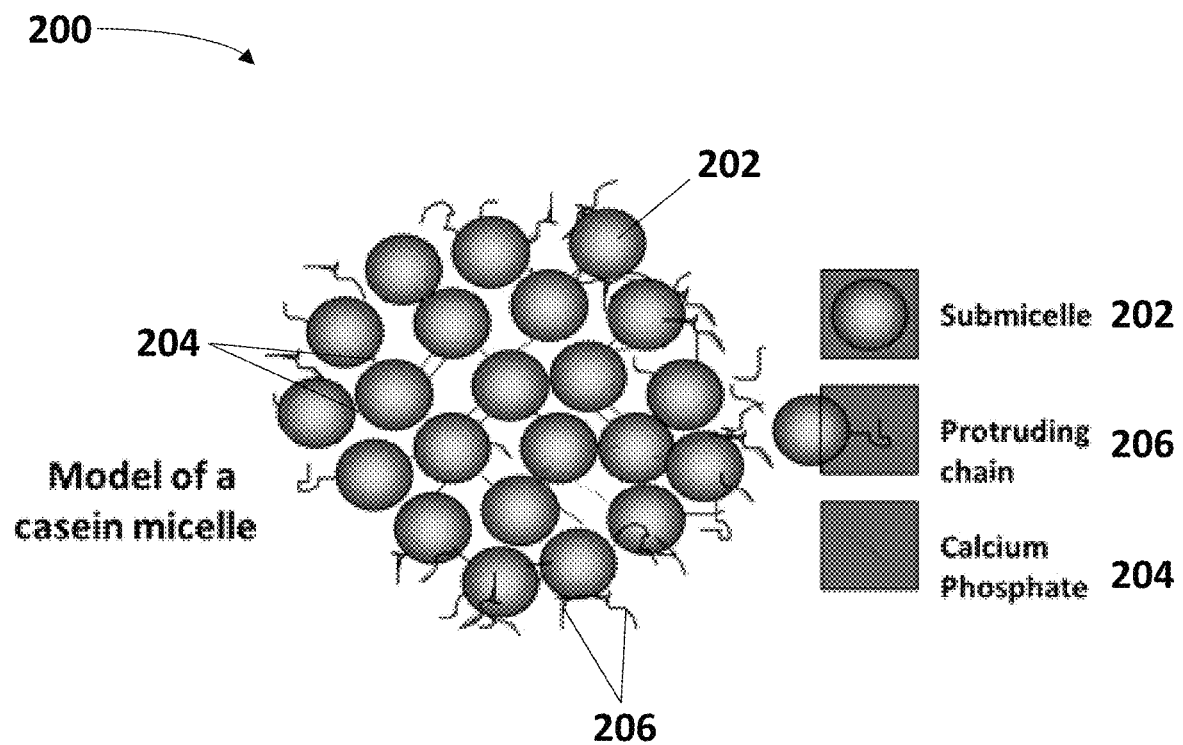
FIG. 2 is a schematic illustration of a casein micelle.

FIG. 2 is a schematic illustration of a casein micelle 200, which may comprise one of the MFGM components dissociated via $CO_2$ treatment in the treatment chamber 112 shown in FIG. 1. As shown, casein typically exists in micellar form in milk or buttermilk. Each micelle 200 may be comprised of an agglomeration of submicelles 202 composed of beta-casein, alpha S1 and alpha S2, which can be linked through calcium phosphate complexes 204 and hydrophobic bonds, thereby burying the submicelles within the overall micelle structure. The micelle 200 can also include κ-casein components 206, which typically reside on or near the surface of the micelle 200, protruding in hair-like fashion.

Figure 3:
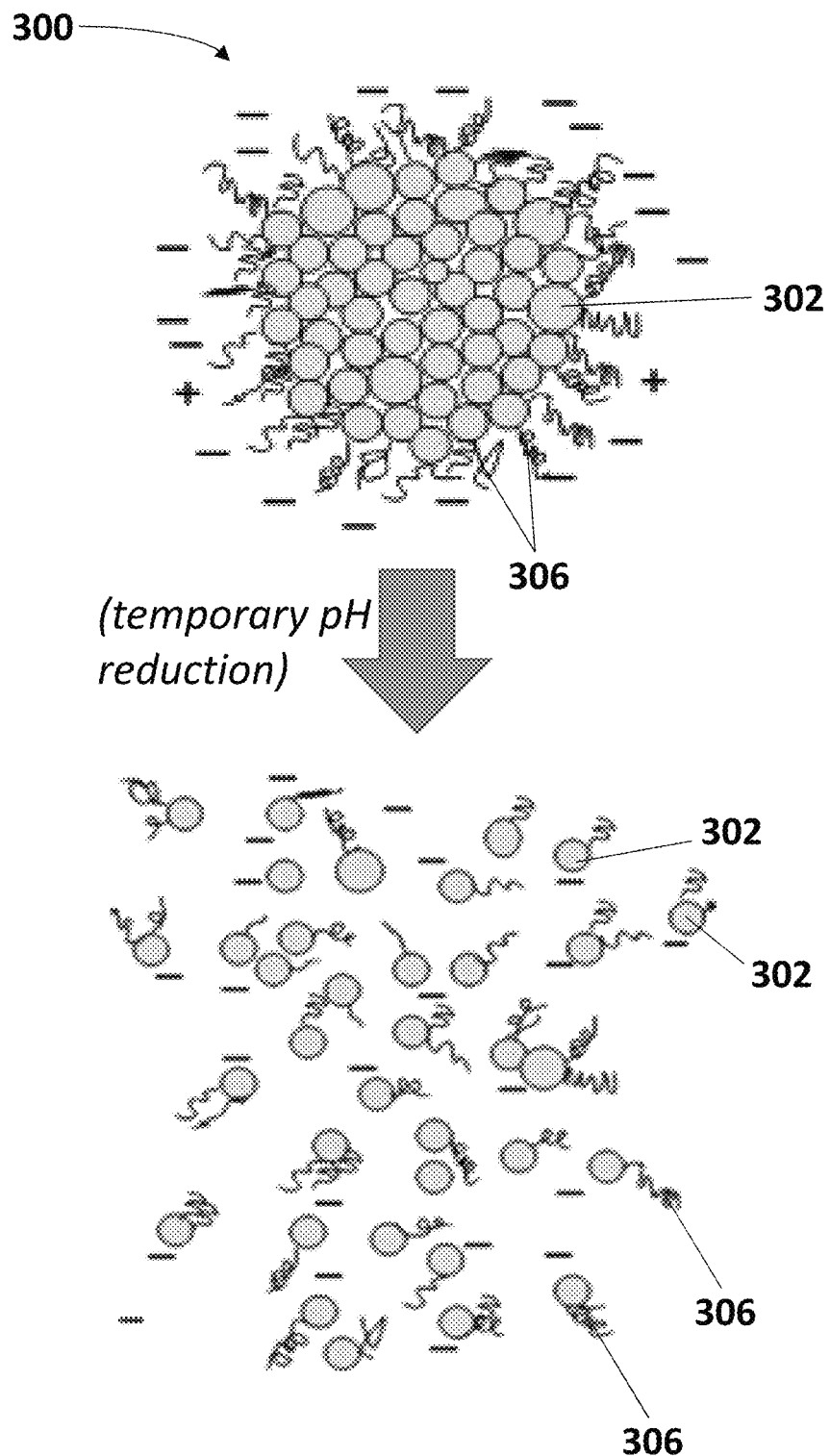
FIG. 3 is a schematic illustration of casein micelle dissociation occurring in accordance with principles of the present disclosure.

FIG. 3 is a schematic illustration of casein micelle dissociation caused by implementation of the systems and methods described herein. An intact casein micelle 300 is shown at the upper portion of the figure, which again includes a plurality of submicelles 302 and hair-like κ-casein proteins 306 protruding therefrom. As shown at the lower portion of the figure, temporary pH reduction of a medium containing the micelle 300, which can be achieved via the $CO_2$ treatments described herein, can open each casein micelle 300 by solubilizing the calcium phosphate complexes linking the submicelles 302 together, thereby breaking up the components of the globular micelle 300 and functionalizing the individual casein proteins, which can be concentrated and collected.

FIG. 4 is a flow diagram of a method of phospholipid concentration performed in accordance with principles of the present disclosure. The example method 400 shows the steps that may be implemented, in any sequence, to concentrate phospholipids from a starting composition comprised of one or more dairy products, such as buttermilk or butter serum. In additional examples, one or more of the steps shown in the method 400 may be omitted. Additional steps can also be added in specific implementations.

In the embodiment shown, the method 400 begins at block 402 by "subjecting a dairy composition to a first ultrafiltration, wherein the first ultrafiltration yields a first permeate and a first retentate." The dairy composition may include buttermilk or butter serum in various embodiments.

At block 404, the method involves "treating the first retentate with carbon dioxide." Carbon dioxide treatment may be performed in a treatment tank, as shown in FIG. 1.

At block 406, the method involves "subjecting the first retentate to microfiltration, wherein the microfiltration yields a second permeate and a second retentate."

At block 408, the method involves "treating the second retentate with carbon dioxide." Carbon dioxide treatment may be implemented during microfiltration in some implementations.

At block 410, the method involves "subjecting the second retentate to a second ultrafiltration, wherein the second ultrafiltration yields a third permeate and a third retentate."

At block 412, the method involves "collecting the third retentate, wherein the third retentate comprises at least about 30 wt % phospholipids."

By subjecting the first retentate 110 and the microfiltration retentate 118 to constant or nearly constant $CO_2$ treatment, and filtering each retentate in the manner described above, various concentration techniques may be avoided. For example, the method 200 may not involve super-critical $CO_2$ treatment, solvent extraction, acidification, and/or centrifugation.

Examples

The nutritional content of two test product samples derived according to the methods herein were compared to the nutritional content of an unprocessed sample of buttermilk (buttermilk control) and an unprocessed sample of raw butter serum (butter serum control). The first test sample was obtained from a starting composition comprised of buttermilk (Buttermilk PL-Protein complex), and the second test sample was obtained from a starting composition comprised of butter serum (Butter Serum PL-Protein complex). The buttermilk test sample was subject to an ultrafiltration step implemented using an ultrafiltration membrane configured to retain molecules having a molecular weight greater than about 10 kDa, followed by $CO_2$ treatment sufficient to lower the pH of the retentate to a pH of 5.7, and a microfiltration step implemented using a microfiltration membrane having a pore size of about 0.3 μm. The butter serum test sample was subject to an ultrafiltration step implemented using an ultrafiltration membrane configured to retain molecules having a molecular weight greater than about 10 kDa, followed by $CO_2$ treatment sufficient to lower the pH of the retentate to a pH of 5.2 and a microfiltration step implemented using a microfiltration membrane having a pore size of about 0.1 μm. The nutritional content of the final retentate compositions was analyzed and the results shown below in Table 1.

TABLE 1

| | Analytical Composition, on Dry Basis | | | |
| --- | --- | --- | --- | --- |
| | Buttermilk Control | Butter Serum Control | Buttermilk PL-Protein complex | Butter Serum PL-Protein complex |
| % Fat | 4.88 | 11.25 | 17.91 | 43.45 |
| % N2 | 5.41 | 1.51 | 10.76 | 6.71 |
| % Protein | 34.5 | 9.86 | 72.01 | 42.84 |
| % Lactose | 46.9 | 32.1 | 3.71 | 4 |
| % PE | 0.53 | 2.53 | 4.02 | 16.03 |
| % PI | 0.18 | 0.13 | 0.61 | 3.87 |
| % PS | 0.49 | 1.26 | 1.36 | 6.78 |
| % PC | 0.43 | 0.13 | 1.16 | 7.74 |
| % SM | 0.26 | 3.03 | 0.80 | 4.62 |
| % Total Phospholipids | 1.89 | 7.09 | 7.95 | 39.04 |

PE = phosphatidyl ethanolamine; PI = phosphatidyl inositol; PS = phosphatidyl serine; PC = phosphatidyl choline; SM = sphingomyelin As shown in Table 1, the total phospholipid content of the buttermilk sample (7.95 wt %) was over four times greater than that of the buttermilk control (1.89 wt %), and the total phospholipid content of the butter serum sample (39.04 wt %) was over 5.5 times greater than the butter serum control (7.09 wt %). The total fat content of the buttermilk sample was 17.91 wt % and the total fat content of the butter serum sample was over 43 wt %, each substantially greater than the 4.88 wt % total fat content of the buttermilk control and the 11.25 wt % total fat content of the butter serum control. The butter serum sample contained less total protein than the buttermilk sample, but each test sample contained more total protein than the buttermilk and butter serum controls. Table 1 further shows that treating a starting composition according to the methods herein may significantly reduce the total lactose content of the final composition, as the buttermilk control contained almost 47 wt % lactose and the butter serum control contained about 32% lactose, while the buttermilk sample and butter serum samples contained total lactose contents of only about 4 wt %. Accordingly, methods herein can significantly reduce lactose content of a buttermilk and butter serum starting composition while increasing the total phospholipid content.

As used herein, the term "about" modifying, for example, the quantity of a component in a composition, concentration, and ranges thereof, employed in describing the embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or inherent variability of starting materials or ingredients used to carry out the methods, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents to these quantities.

Similarly, it should be appreciated that in the foregoing description of example embodiments, various features are sometimes grouped together in a single embodiment for the purpose of streamlining the disclosure and aiding in the understanding of one or more of the various aspects. These methods of disclosure, however, are not to be interpreted as reflecting an intention that the claims require more features than are expressly recited in each claim. Rather, as the following claims reflect, inventive aspects lie in less than all features of a single foregoing disclosed embodiment, and each embodiment described herein may contain more than one inventive feature.

Although the present disclosure provides references to preferred embodiments, persons skilled in the art will recognize that changes may be made in form and detail without departing from the spirit and scope of the invention.

What is claimed is:

1. A system for concentrating phospholipids, the system comprising:
 a first ultrafiltration apparatus configured to subject a dairy composition comprising butter serum or buttermilk to ultrafiltration, wherein the ultrafiltration yields a first permeate and a first retentate;
 a microfiltration apparatus configured to subject the first retentate to microfiltration, wherein the microfiltration yields a second permeate and a second retentate different from the first permeate and the first retentate;
 a second ultrafiltration apparatus configured to subject the second retentate to ultrafiltration, wherein the ultrafiltration yields a third permeate and a third retentate different from the second permeate and the second retentate; and a carbon dioxide injector configured to inject carbon dioxide into the system such that the first retentate and the second retentate are treated with carbon dioxide, wherein the third retentate comprises a solution comprising at least about 30 wt % phospholipids.

2. The system of claim 1, further comprising a drying apparatus configured to dry the third retentate to yield a powder composition from the solution.

3. The system of claim 1, wherein the carbon dioxide injector is coupled to the microfiltration apparatus via a first valve-controlled tube and is coupled to the second ultrafiltration apparatus via a second valve-controlled tube.

4. The system of claim 1, wherein the carbon dioxide injector is configured to reduce the pH of the first retentate and the second retentate to a range of about 4.8 to about 5.8.

5. The system of claim 1, wherein the first ultrafiltration apparatus comprises a membrane perimeter ranging from about 2-14 in. by about 50-16 in.

6. The system of claim 5, wherein the microfiltration apparatus comprises membrane perimeter ranging from about 2-14 in. by about 50-16 in.

7. The system of claim 6, wherein the second ultrafiltration apparatus comprises a membrane perimeter ranging from about 2-14 in. by about 50-16 in.

* * * * *